(12) United States Patent
Chang (10) Patent No.: US 9,268,365 B2
(45) Date of Patent: Feb. 23, 2016

(54) PROTECTING COVER

(71) Applicant: Chun-Che Chang, Taipei (TW)

(72) Inventor: Chun-Che Chang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 72 days.

(21) Appl. No.: 14/048,046

(22) Filed: Oct. 8, 2013

(65) Prior Publication Data

US 2014/0102924 A1  Apr. 17, 2014

Related U.S. Application Data

(60) Provisional application No. 61/714,233, filed on Oct. 16, 2012.

(30) Foreign Application Priority Data

Aug. 6, 2013  (CN) .......................... 2013 1 0339712

(51) Int. Cl.
*G06F 1/16* (2006.01)
*H05K 13/00* (2006.01)
*A45C 11/00* (2006.01)

(52) U.S. Cl.
CPC ............ *G06F 1/1633* (2013.01); *G06F 1/1669* (2013.01); *G06F 1/1688* (2013.01); *A45C 2011/002* (2013.01); *A45C 2011/003* (2013.01); *G06F 2200/1634* (2013.01)

(58) Field of Classification Search
CPC ................... A45C 2011/002; A45C 2011/003; A45C 2200/15; G06F 1/1613; G06F 1/1634; G06F 1/1675; G06F 1/1681; G06F 1/181; G06F 1/1683; G06F 1/1623; G06F 1/1616; G06F 1/166; G06F 1/1669; G06F 220/1633; H05K 5/0234; B65D 25/24; E05D 9/00; E05D 9/05
USPC .............................. 220/230; 16/320, 327–330
See application file for complete search history.

(56) References Cited

U.S. PATENT DOCUMENTS

| | | | | |
|---|---|---|---|---|
| 5,356,027 A * | 10/1994 | Craft et al. | .................... | 220/840 |
| 5,812,285 A * | 9/1998 | Lin et al. | ........................ | 358/497 |
| 6,363,576 B1 * | 4/2002 | Hsu et al. | ........................ | 16/239 |
| 6,653,919 B2 * | 11/2003 | Shih-Chung et al. | ......... | 335/207 |
| 6,684,089 B1 * | 1/2004 | Lee | ............................. | 455/575.3 |
| 6,972,878 B2 * | 12/2005 | Shyu | .............................. | 358/497 |
| 7,486,165 B2 * | 2/2009 | Ligtenberg et al. | ........... | 335/205 |

(Continued)

FOREIGN PATENT DOCUMENTS

CN  201936222  8/2011

*Primary Examiner* — Mickey Yu
*Assistant Examiner* — Gideon Weinerth
(74) *Attorney, Agent, or Firm* — Jiang Chyun IP Office (57) ABSTRACT

A protecting cover detachably disposed at an electronic device is provided. The electronic device has an arc side and a first magnetic element disposed in the arc side. The protecting cover includes a covering part and a pivot part. The pivot part is connected to the covering part, and the pivot part includes an arc area and a second magnetic element disposed in the arc area. The outer line of the arc area corresponds to the arc side, and the first magnetic element is magnetically attracted with the second magnetic element to make the pivot part detachably connected to the arc side. The protecting cover uses the second magnetic element in the pivot part to attract the electronic device with the first magnetic element in the arc side, and thus the protecting cover can be fixed at the electronic device.

8 Claims, 6 Drawing Sheets

(56) References Cited

U.S. PATENT DOCUMENTS

| | | | | |
|---|---|---|---|---|
| 7,565,720 B1* | 7/2009 | Ligtenberg | | G06F 1/1681 16/366 |
| 7,657,971 B2* | 2/2010 | Danko | | E05D 1/00 16/320 |
| 8,143,983 B1* | 3/2012 | Lauder et al. | | 335/219 |
| 8,344,836 B2* | 1/2013 | Lauder et al. | | 335/219 |
| 8,428,663 B2* | 4/2013 | Sano | | H04M 1/0237 455/347 |
| 8,724,300 B2* | 5/2014 | Smith et al. | | 361/679.01 |
| 8,947,864 B2* | 2/2015 | Whitt et al. | | 361/679.09 |
| 9,013,867 B2* | 4/2015 | Becze et al. | | 361/679.27 |
| 9,104,382 B2* | 8/2015 | Chen | | G06F 1/1681 |
| 2007/0133156 A1* | 6/2007 | Ligtenberg et al. | | 361/681 |
| 2010/0053877 A1* | 3/2010 | Hsu | | G06F 1/1616 361/679.27 |
| 2010/0123663 A1* | 5/2010 | Leung et al. | | 345/169 |
| 2010/0232100 A1* | 9/2010 | Fukuma | | F16G 13/18 361/679.01 |
| 2010/0238620 A1* | 9/2010 | Fish | | 361/679.09 |
| 2010/0283270 A1* | 11/2010 | Hood, III | | E05B 17/0033 292/251.5 |
| 2010/0321877 A1* | 12/2010 | Moser | | G06F 1/1616 361/679.29 |
| 2011/0075340 A1* | 3/2011 | Qin | | G06F 1/1616 361/679.09 |
| 2011/0147398 A1* | 6/2011 | Ahee et al. | | 220/810 |
| 2011/0284420 A1 | 11/2011 | Sajid | | |
| 2012/0120627 A1* | 5/2012 | O'Connor et al. | | 361/807 |
| 2012/0194448 A1* | 8/2012 | Rothkopf | | 345/173 |
| 2012/0257368 A1* | 10/2012 | Bohn et al. | | 361/809 |
| 2012/0325838 A1* | 12/2012 | Huang | | 220/810 |
| 2013/0043148 A1* | 2/2013 | Chen et al. | | 206/45.23 |
| 2013/0063873 A1* | 3/2013 | Wodrich | | G06F 1/1635 361/679.01 |
| 2013/0146322 A1* | 6/2013 | Chang | | G06F 1/1626 174/50 |
| 2013/0329359 A1* | 12/2013 | Andre et al. | | 361/679.55 |
| 2014/0043121 A1* | 2/2014 | Sartee et al. | | 335/219 |
| 2014/0132133 A1* | 5/2014 | Chiou | | A45C 11/00 312/223.2 |
| 2014/0246340 A1* | 9/2014 | Jiang et al. | | 206/45.23 |
| 2014/0293519 A1* | 10/2014 | Wang | | G06F 1/1681 361/679.01 |
| 2014/0328014 A1* | 11/2014 | Lan | | G06F 1/1681 361/679.27 |
| 2015/0049426 A1* | 2/2015 | Smith et al. | | 361/679.27 |
| 2015/0177785 A1* | 6/2015 | Liang | | 361/679.17 |

* cited by examiner

PROTECTING COVER

CROSS-REFERENCE TO RELATED APPLICATION

This application claims the priority benefits of U.S. provisional application Ser. No. 61/714,233, filed on Oct. 16, 2012 and China application serial no. 201310339712.1, filed on Aug. 6, 2013. The entirety of each of the above-mentioned patent applications is hereby incorporated by reference herein and made a part of this specification.

BACKGROUND OF THE INVENTION

1. Field of the Invention

An invention relates to a protecting cover and, more particularly, to a protecting cover of an electronic device.

2. Description of the Related Art

As science technology develops, various portable electronic devices, such as a smartphone or a tablet computer, are produced. However, the portable electronic device is easily hit or crashed by accident since it is carried and used anywhere with users. Further, the casing of the portable electronic device is easily worn out and damaged with high usage frequency. Therefore, protecting covers are available for protecting the portable electronic devices. Some protecting covers can be folded to support the electronic device, and the user does not need to carry the protecting cover and a supporter at the same time.

Meanwhile, a virtual keyboard on the touchable screen of an electronic device is used for information input. However, the virtual keyboard is size limited by the touchable screen. When the user needs to input large amounts of text, an external physical keyboard is required to improve the input efficiency and have a better feeling for typing. However, the electronic device, the protecting cover and the physical keyboard cannot be carried at the same time with users who do not want to be burdened with multiple objects.

BRIEF SUMMARY OF THE INVENTION

A protecting cover attached to a peripheral device and an electronic device is provided, which is convenient for carrying.

A protecting cover is detachably disposed at an electronic device. The electronic device includes an arc side and a first magnetic element which is disposed in the arc side. The protecting cover includes a covering part and a pivot part. The pivot part is connected to the covering part, and it includes an arc area and a second magnetic element which is embedded in the arc area. The outer line of the arc area corresponds to the arc side, and the first magnetic element is magnetically attracted with the second magnetic element to make the pivot part detachably connected to the arc side.

The protecting cover is also applied to a portable peripheral device. The peripheral device includes a fourth magnetic element. The fourth magnetic element is attracted by the third magnetic element to make the peripheral device detachably fixed to the covering part.

These and other features, aspects and advantages of the present disclosure will become better understood with regard to the following description, appended claims, and accompanying drawings.

DETAILED DESCRIPTION OF THE EMBODIMENTS

Figure 1:
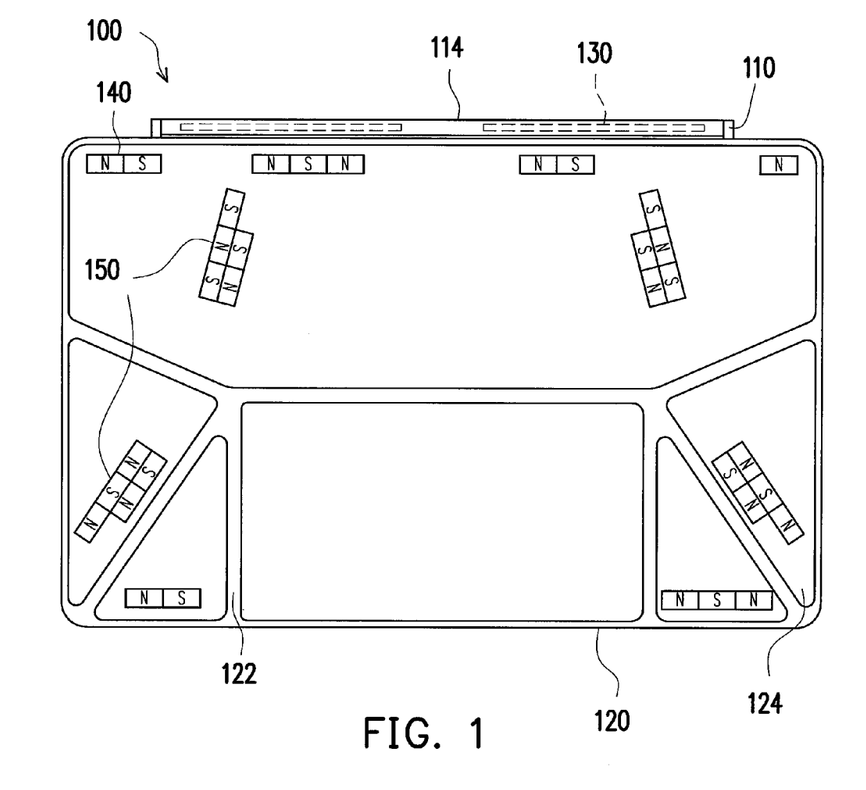
FIG. 1 is a schematic diagram showing a protecting cover in an embodiment.
Figure 2A:
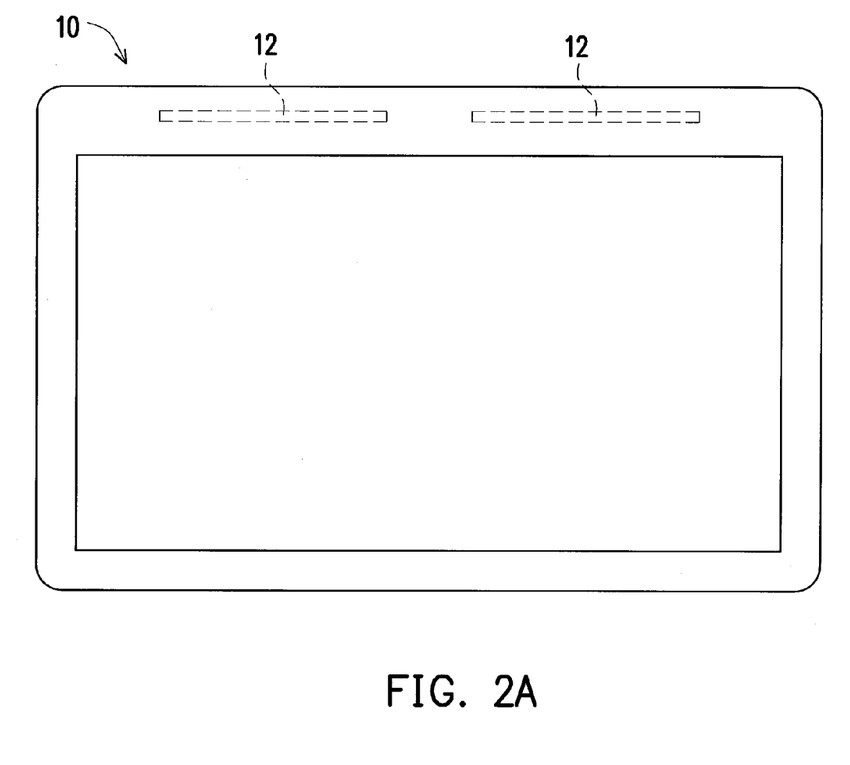
FIG. 2A is a schematic diagram showing an electronic device to be adapted to the protecting cover in FIG. 1.
Figure 2B:
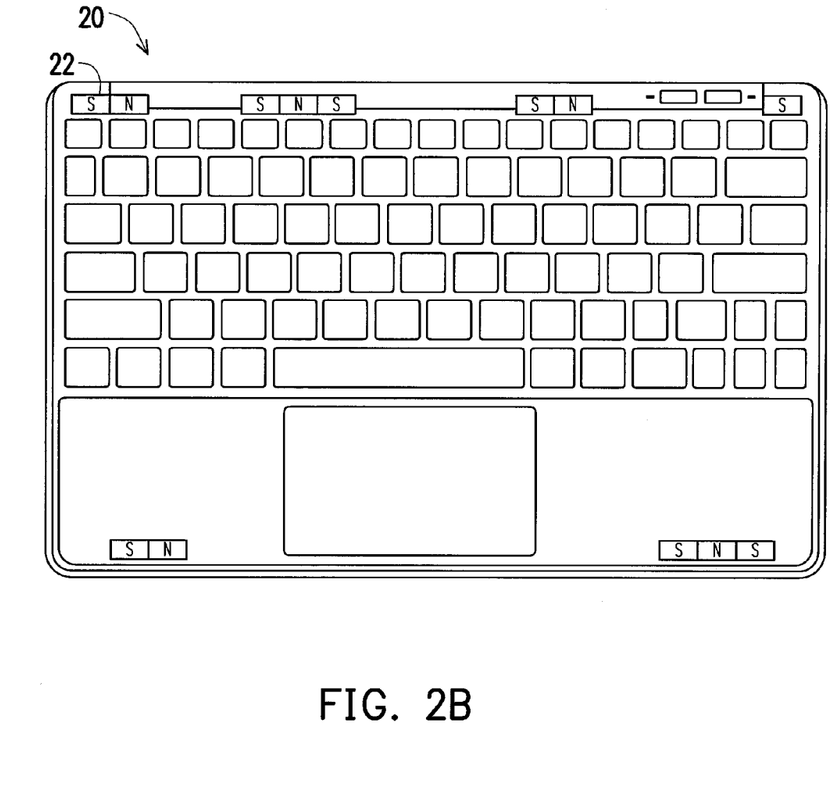
FIG. 2B is a schematic diagram showing a portable peripheral device to be adapted to the protecting cover in FIG. 1.

Please refer to FIG. 1 to FIG. 2B, a protecting cover 100 in an embodiment is detachably disposed at an electronic device 10, and it is adapted to a portable peripheral device 20. In the embodiment, the electronic device 10 is a tablet computer and the peripheral device 20 is a wireless keyboard as an example. In other embodiments, the electronic device 10 may be a mobile phone, and the peripheral device 20 may be a loudspeaker, which is not limited herein.

Figure 4A:
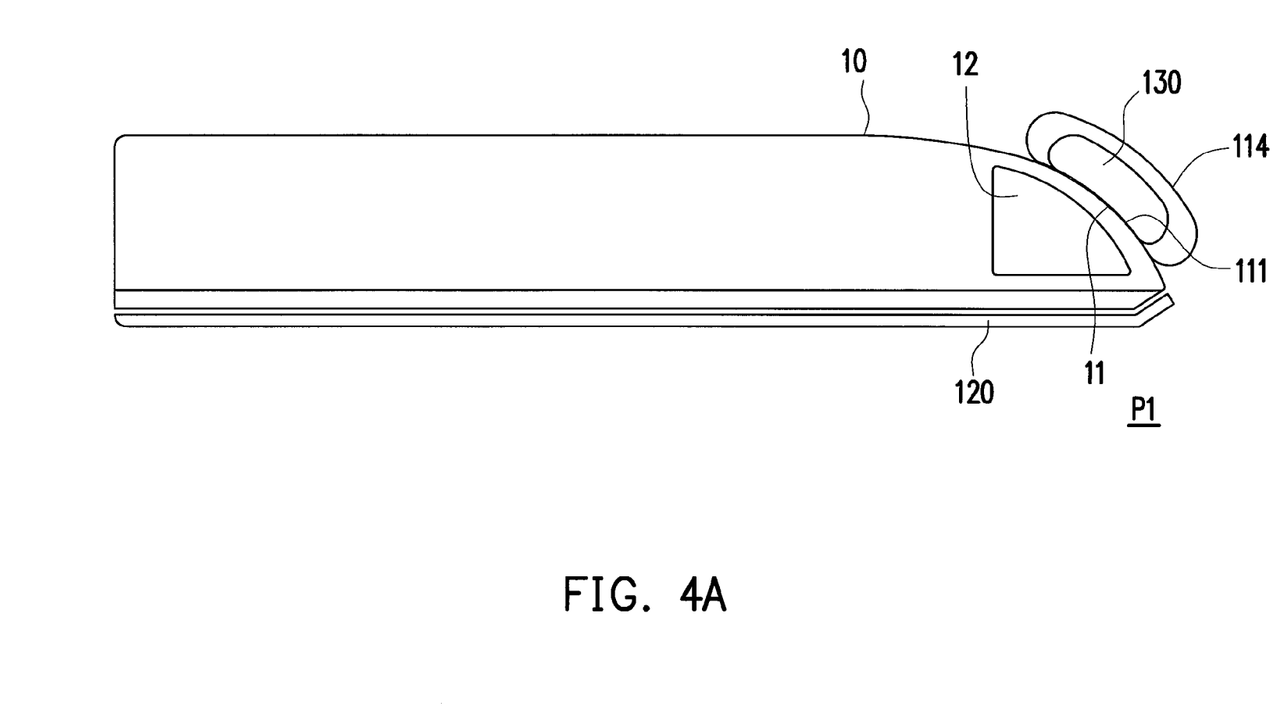
FIG. 4A is a sectional diagram showing a protecting cover covering an electronic device along an A-A line in FIG. 3A.

As shown in FIG. 2A and FIG. 4A, the electronic device 10 applying the protecting cover 100 in the embodiment includes an arc side 11 and a first magnetic element 12, and the first magnetic element 12 is disposed in the arc side 11 of the electronic device 10. As shown in FIG. 2B, the peripheral device 20 includes a fourth magnetic element 22. Since multiple electronic components are usually disposed at a central part of the peripheral device 20, the fourth magnetic element 22 is disposed near the edge of the peripheral device 20 to keep away from the electronic components. It is noted that the arrangement of the electronic components inside the peripheral device 20 is not limited herein.

Please refer to FIG. 1, the protecting cover 100 in the embodiment includes a pivot part 110, a covering part 120, a second magnetic element 130, a third magnetic element 140 and a pair of fifth magnetic elements 150.

The covering part 120 is connected to the pivot part 110. The covering part 120 includes multiple creases 122 to define multiple folding blocks 124. The user can fold the covering part 120 along the creases 122 to make the covering part 120 deform and support the electronic device 10.

As shown in FIG. 4A, the pivot part 110 includes an arc area 114 and a second magnetic element 130 which is embedded in the arc area 114. The outer line 111 of the arc area 114 corresponds to the arc side 11. The second magnetic element 130 is magnetically attracted with the first magnetic element 12 to make the pivot part 110 detachably connected to the arc side 11 of the electronic device 10.

Please refer to FIG. 1 again, the third magnetic element 140 is disposed in one of the folding blocks 124 and is near the edge of the covering part 120 corresponding to the fourth magnetic element 22. The fourth magnetic element 22 is magnetically attracted by the third magnetic element 140 to make the peripheral device 20 detachably fixed to the covering part 120. In the embodiment, the fourth magnetic element 22 is made of a magnetic material corresponding to the third magnetic element 140, which means the fourth magnetic element 22 is a magnet having opposite magnetism to the third magnetic element 140. The fourth magnetic element 22 may also be made of metal, such as a metal casing of the peripheral device 20.

The fifth magnetic elements 150 are disposed in two adjacent folding blocks 124, respectively. When the two folding blocks 124 approach to each other, the two fifth magnetic elements 150 attracts each other to fold the protecting cover 100 in a supporting state. If the fourth magnetic element 22 is a metal casing of the peripheral device 20, when the peripheral device 20 is placed at the protecting cover 100, the metal casing of the peripheral device 20 is attracted by the third magnetic element 140 and the fifth magnetic elements 150 to be stably fixed at the protecting cover 100.

In the embodiment, the protecting cover 100 is attracted and attached to the electronic device 10 and the peripheral device 20 via the magnetic elements, and the protecting cover 100 is maintained at a supporting state via the fifth magnetic elements 150. Since the weight and the size of the electronic device 10 and the peripheral device 20 may be different, the number, the size and configuration of the magnetic elements can be adjusted to achieve a fixing effect. Moreover, the first magnetic element 12, the fourth magnetic element 22, the second magnetic element 130, the third magnetic element 140 and the fifth magnetic elements 150 include an N pole and an S pole, respectively. The N pole and the S pole of corresponding magnetic elements are disposed opposite to each other, so as to provide a better magnetic attracting force.

Figure 3A:
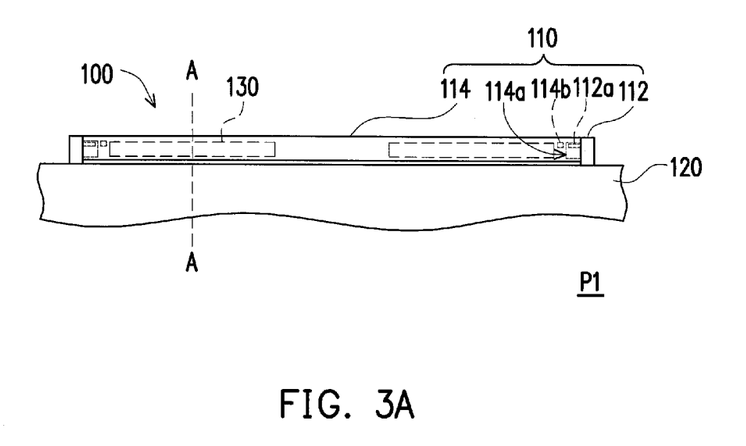
FIG. 3A is a schematic diagram showing an arc area of the protecting cover in FIG. 1 at an initial position (P1) relative to two end parts.
Figure 3B:
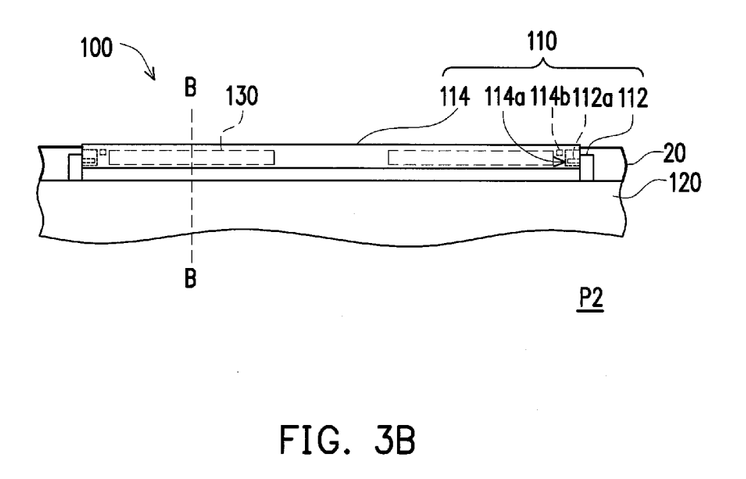
FIG. 3B is a schematic diagram showing an arc area of the protecting cover in FIG. 1 at a stretching position (P2) relative to two end parts.

Please refer to FIG. 3A and FIG. 3B, in the embodiment, the pivot part 110 includes two end parts 112 connected to the covering part 120 and the arc area 114 between the end parts 112.

The second magnetic element 130 is disposed in the arc area 114. The arc area 114 includes two holding recesses 114a at two sides, and each of the end parts 112 includes a protruding column 112a. The two protruding columns 112a extend into the two holding recesses 114a, respectively, and move in the holding recesses 114a along a direction vertical to a line between the end parts 112 to define an initial position P1 (as shown in FIG. 3A) and a stretching position P2 (as shown in FIG. 3B) of the arc area 114 relative to the end parts 112. Thus, a distance between the arc area 114 and the covering part 120 can be adjusted. The protruding columns 112a are slidable and restricted in the holding recesses 114a. Therefore, the sliding movement of the protruding columns 112a from the initial position P1 to the stretching position P2 is restricted by the holding recesses 114a. This way, the arc area 114 does not separate completely from the end parts 112 because the protruding columns 112a are restricted in the holding recesses 114a.

Please refer to FIG. 4A, when the outer line 111 of the pivot part 110 of the protecting cover 100 is disposed at the arc side 11 of the electronic device 10, the arc area 114 of the protecting cover 100 is attached to the arc side 11 of the electronic device 10, and the covering part 120 contacts the electronic device 10. Meanwhile, the arc area 114 is at the initial position P1 relative to the end parts 112, and a gap between the arc area 114 and the covering part 120 is small.

Figure 4B:
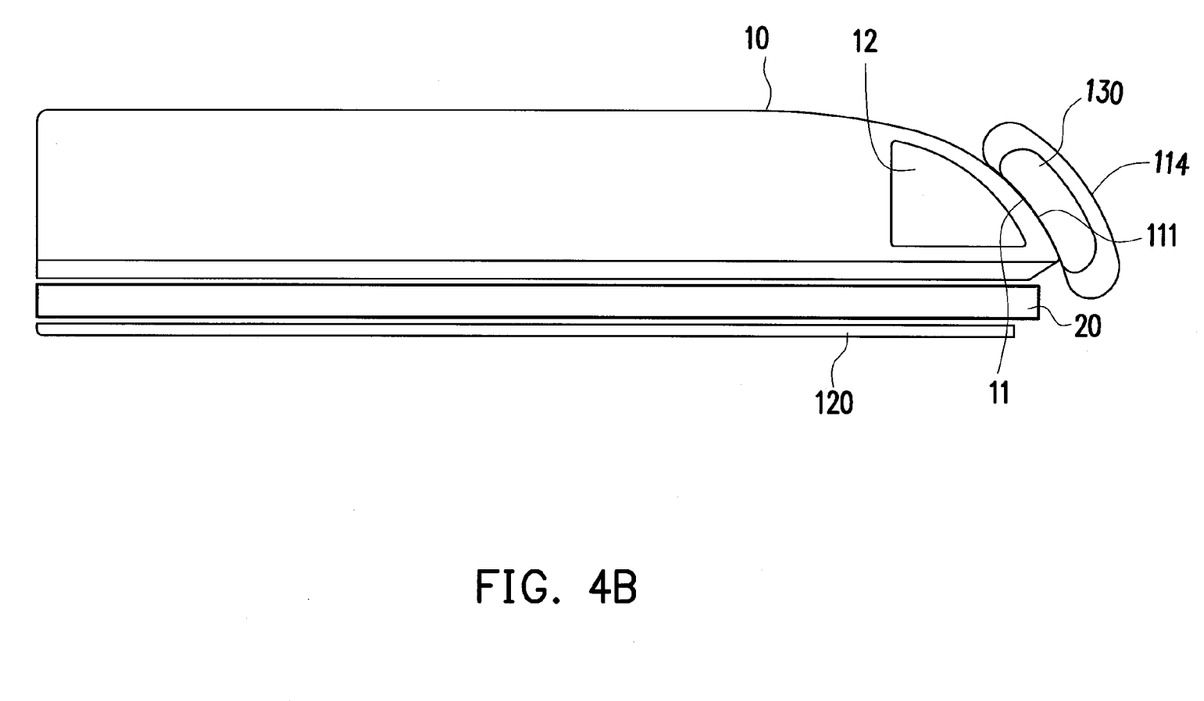
FIG. 4B is a sectional diagram showing a protecting cover covering an electronic device and a peripheral device along a B-B line in FIG. 3B.

Please refer to FIG. 4B, since the peripheral device 20 has a certain thickness, when the outer line 111 of the pivot part 110 of the protecting cover 100 is disposed at the arc side 11 of the electronic device 10, and the peripheral device 20 is between the covering part 120 and the electronic device 10, the arc area 114 can generate a distance relative to the end parts 112 via the holding recesses 114a and the protruding columns 112a of the end parts 112, as shown in FIG. 4B, so as to make the arc area 114 attached to the arc side 11 of the electronic device 10. At the moment, the arc area 114 is at the stretching position P2 relative to the end parts 112. The gap between the arc area 114 and the covering part 120 becomes larger, and thus the protecting cover 100 can fixed at the electronic device 10, and the peripheral device 20 is held between the protecting cover 100 and the electronic device 10.

Furthermore, as shown in FIG. 4A and FIG. 4B, the first magnetic element 12 has an arc outline corresponding to the arc side 11, and the second magnetic element 130 also has an arc inner line corresponding to the outer line 111. When the outer line 111 of the pivot part 110 is attached to the arc side 11 of the electronic device 10, the distances between the different points of the inner surface of the second magnetic element 130 and the outer surface of the first magnetic element 12 are the same, so as to make the pivot part 110 of the protecting cover 100 firmly attracted by the arc side 11 of the electronic device. Moreover, since the arc side 11 of the electronic device 10 has a same outline with the first magnetic element 12, when the pivot part 110 moves along the arc side 11 of the electronic device 10, the distance between the inner surface of the second magnetic element 130 and the outer surface of the first magnetic element 12 keeps the same, so as to form a larger magnetic attraction area between the first magnetic element 12 and the second magnetic element 130.

In the embodiment, the arc area 114 can be attracted with a specific part of the arc side 11 of the electronic device 10 via the arc side 11 of the electronic device 10, the outer line 111 of the pivot part 110, the arc outline of the first magnetic element 12 and the arc inner line of the second magnetic element 130. Even though when the arc area 114 is at the initial position P1 and the stretching position P2, the arc area 114 is attached to the arc side 11 of the electronic device 10 at different positions, and the arc area 114 would not slip off the arc side 11 of the electronic device 10.

Please refer to FIG. 3A and FIG. 3B again, in the embodiment, the arc area 114 further includes two sixth magnetic elements 114b. The sixth magnetic elements 114b are disposed beside the protruding columns 112a when the arc area 114 is at the initial position P1, respectively, and the protruding columns 112a is made of metal or a magnetic material corresponding to the sixth magnetic elements 114b. That is to say, the protruding columns 112a and the sixth magnetic elements 114b are magnetically attracted, so as to be aligned in a direction parallel to a line between the end parts 112 as seen in the initial position P1. When the peripheral device 20 is inserted between the protection cover 100 and the electronic device 10, the protruding columns 112a move from the initial position P1 to the stretching position P2. Although there is a magnetic attraction between the sixth magnetic elements 114b and the protruding columns 112a, the peripheral device overcomes the magnetic attraction so that the sixth magnetic elements 114b and the protruding columns 112a are not aligned as seen in the stretching position P2. When the peripheral device 20 between the protecting cover 100 and the electronic device 10 is taken out, the protruding columns 112a are attracted by the sixth magnetic elements 114b to make the arc area 114 move back to the initial position P1.

In summary, through the second magnetic element in the pivot part and the third magnetic element in the covering part, the protecting cover attracts the electronic device with the first magnetic element at the arc side and the peripheral device with the fourth magnetic element. Thus, the protecting cover can cover the electronic device and the peripheral device at the time. Since the peripheral device can be detached from the covering part easily, the peripheral device is not limited by the protecting cover and can move to any position. The protecting cover can be folded and fixed via the fifth magnetic elements to support the electronic device.

Furthermore, when the distance between the protecting cover and the electronic device is large (for example, the peripheral device is disposed between the protecting cover and the electronic device), the arc area of the pivot part can move to the stretching position relative to the two end parts which are connected to the covering part. This way, the arc area is attached to the arc side of the electronic device. The arc outline of the first magnetic element and the arc inner line of the second magnetic element provide a larger magnetic attraction area. Therefore, even though the arc area is moves between the initial position and the stretching position and the arc area is attached to the side of the electronic device at different positions, the arc area would not slip off the electronic device. Additionally, the protecting cover attracts the protruding columns of the end parts via the sixth magnetic elements of the arc area. When the peripheral device is moved away, the arc area can move back to the initial position.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A protecting cover adapted for an electronic device, wherein the electronic device includes an arc side and a first magnetic element, disposed in the arc side, the protecting cover comprising:
   a covering part; and
   a pivot part connected to the covering part, wherein the pivot part includes:
      an arc area having a curvature that matches the arc side of the electronic device, wherein the arc area includes two holding recesses at two sides of the arc area;
      a second magnetic element, embedded in the arc area, wherein the first magnetic element is magnetically attracted to the second magnetic element to detachably connect the pivot part to the electronic device; and
      two end parts disposed at either end of the arc area, each of the end parts including a protruding column extending into and moving within the corresponding holding recess thereby allowing the arc area to move between an initial position and a stretching position relative to the two end parts.

2. The protecting cover according to claim 1, wherein the protecting cover further includes:
   a third magnetic element disposed at the covering part.

3. The protecting cover according to claim 1, wherein the covering part includes multiple creases to define multiple folding blocks.

4. The protecting cover according to claim 2, wherein the protecting cover is also applied to a portable peripheral device, the peripheral device includes a fourth magnetic element, and the fourth magnetic element is magnetically attracted with the third magnetic element to make the peripheral device detachably fixed at the covering part.

5. The protecting cover according to claim 4, wherein the fourth magnetic element is made of metal or a magnetic material corresponding to the third magnetic element.

6. The protecting cover according to claim 3, wherein the protecting cover further includes:
   a pair of fifth magnetic elements disposed in two adjacent folding blocks, respectively, wherein when the two folding blocks approach each other, the fifth magnetic elements attract each other to make the protecting cover in a supporting state.

7. The protecting cover according to claim 1, wherein the arc area further includes two sixth magnetic elements beside the two protruding columns when the arc area is at the initial position, and the protruding columns are made of metal or a magnetic material corresponding to the sixth magnetic elements.

8. The protecting cover according to claim 1 wherein when the pivot part is disposed at a side of the electronic device and the covering part contacts the electronic device, the arc area is at the initial position relative to the end parts, and when the pivot part is disposed at a side of the electronic device and a peripheral device is disposed between the covering part and the electronic device, the arc area is at the stretching position relative to the end parts.

* * * * *